United States Patent [19]
Bright et al.

[11] Patent Number: 5,676,009
[45] Date of Patent: Oct. 14, 1997

[54] PIPE STRAIGHTENER AND REROUNDER DEVICE

[75] Inventors: Bobby K. Bright, Sweetwater; Ronald L. Bullock, Clinton, both of Tenn.; Reijo N. Stoor, Shorewood, Ill.

[73] Assignee: Chevron U.S.A., Inc., San Francisco, Calif.

[21] Appl. No.: 597,709

[22] Filed: Feb. 7, 1996

[51] Int. Cl.[6] .................................................. B21D 3/05
[52] U.S. Cl. .................................. 72/161; 72/164; 72/162
[58] Field of Search ............................ 72/161, 162, 164, 72/165

[56] References Cited

U.S. PATENT DOCUMENTS

| | | |
|---|---|---|
| 336,899 | 3/1886 | Davis . |
| 1,408,791 | 3/1922 | Wolffgram .................................. 72/164 |
| 2,293,156 | 8/1942 | Mason ...................................... 72/162 |
| 2,350,274 | 5/1944 | Duclos ..................................... 72/164 |
| 2,392,323 | 1/1946 | Koss ........................................ 80/32 |
| 2,702,937 | 3/1955 | Smart ...................................... 29/547 |
| 3,237,438 | 3/1966 | Tesson ..................................... 72/160 |
| 3,242,566 | 3/1966 | White ...................................... 29/566 |
| 3,266,280 | 8/1966 | Wiig ........................................ 72/134 |
| 3,282,304 | 11/1966 | Coleman .................................. 140/147 |
| 3,410,126 | 11/1968 | Baker ...................................... 72/164 |
| 3,442,108 | 5/1969 | Müller ..................................... 72/164 |
| 3,712,100 | 1/1973 | Key ......................................... 72/161 |
| 3,855,835 | 12/1974 | Tisdale, III et al. ....................... 72/183 |
| 3,872,680 | 3/1975 | Nicholson et al. ....................... 61/72.3 |
| 3,965,713 | 6/1976 | Horton .................................... 72/146 |
| 4,157,023 | 6/1979 | Tisdale et al. ........................... 72/161 |
| 4,334,418 | 6/1982 | Grandell .................................. 72/164 |
| 4,917,540 | 4/1990 | Recalde ................................... 72/161 |

FOREIGN PATENT DOCUMENTS 197525   7/1992   Japan ........................................ 72/162

Primary Examiner—Daniel C. Crane
Attorney, Agent, or Firm—Burns, Doane, Swecker & Mathis, LLP

[57] ABSTRACT

A portable device for straightening and rerounding plastic pipe with a straightening unit having three rollers, one of which is adjustable toward and away from the other two for reverse bending plastic pipe passing therebetween and with a rerounding unit having two rollers for applying sufficient pressure to the plastic pipe to remove ovalness.

23 Claims, 4 Drawing Sheets

5,676,009

PIPE STRAIGHTENER AND REROUNDER DEVICE

This application claims the benefit of U.S. Provisional application No. 60/007,271 filed Nov. 6, 1995.

BACKGROUND OF THE INVENTION

1. Field of the Invention

The present invention is directed to a device for straightening and rerounding pipe, particularly plastic pipe such as polyolefin pipe including polyethylene pipe. The invention provides a novel and improved portable device for removing coil set and ovalness from plastic pipe that has been coiled so that the pipe may be fused easier, used more rapidly and used more safely at a job site without the danger of uncontrolled recoiling.

2. Prior Art

Plastic pipe, primarily polyethylene pipe, is used in many different applications such as relining existing pipe or duct systems or for use in directional boring under a creek, etc. The plastic pipe is wound onto large reels or coils (commonly referred to as coils, hereinafter) after it is produced so that it may be stored and eventually transported to a job site. The pipe usually develops a non-circular cross-sectional shape (typically, an oval shape) when it is wound into a coil. Likewise, the pipe develops a coiled configuration (i.e., coil set) as a result of being stored in a coil. The non-circular shape and coil set make the pipe very difficult to work with when it is uncoiled for use. In fact, the plastic pipe has excellent "memory" and can recoil if it is not straightened. The recoil can damage equipment and injure or kill people.

The range of prior art devices are primarily directed to straightening metallic pipe. These devices usually consist of multiple straightening rollers but do not provide for rerounding the pipe. U.S. Pat. Nos. 3,237,438 to Tesson, 3,855,835 to Tisdale III et al., 3,872,680 to Nicholson et al., 3,965,713 to Horton, and 4,157,023 to Tisdale et al. are typical of portable metallic pipe straightening devices having a plurality of straightening rollers. In general, none of these prior art devices provide roller geometry that is adjustable to accommodate various pipe dimensions. In addition, none of these devices provide for rerounding the pipe.

U.S. Pat. No. 336,899 to Davis is directed to a stationary machine for sizing, straightening, and finishing metallic tubes. The device consists of a plurality of rollers all in a vertical plane. As the tube is moved through the device it is first sized, then straightened.

In view of the limitations of prior art devices, it would be highly desirable to have a portable device that would first straighten various size plastic pipe and then reround the pipe.

SUMMARY OF THE INVENTION

One object of the subject invention is to make pipe straightening and rerounding a simple, rapid procedure that can be done on-site while improving the safety of the procedure. To accomplish this purpose there is provided a portable device having a pipe straightening mechanism and a rerounding mechanism mounted perpendicular to the pipe straightening mechanism. The pipe straightening mechanism and rerounding mechanism are adjustable to accommodate different pipe dimensions.

In one aspect of the invention there is provided a portable device for removing coil set and ovalness from coiled pipe as it is unwound, comprising a first fixed roller for contacting a first surface of the pipe and having an axis, a second fixed roller spaced rearward in the portable device from the first fixed roller for contacting the first surface of the pipe, the second fixed roller having an axis parallel to the axis through the first fixed roller, a movable roller located between the first fixed roller and the second fixed roller for contacting a second surface of the pipe opposite of the first surface, the movable roller is adjustable toward and away from a plane through the axis of the first fixed roller and the axis of the second fixed roller for removing substantially all of the permanent curvature in the pipe by applying pressure to the pipe, a stationary roller located aft of the second fixed roller for contacting a third surface between the first surface and the second surface of the pipe and having an axis, and an adjustable roller for contacting a fourth surface of the pipe opposite of the third surface and having an axis parallel to the axis of the stationary roller, the adjustable roller is directly opposed to the stationary roller and adjustable toward the stationary roller for applying pressure to remove the ovalness of the pipe.

In another aspect of the invention there is provided a portable device for removing coil set and ovalness from coiled pipe, comprising a straightening means for removing substantially all of the permanent curvature in the pipe caused by being coiled and a rerounding means orientated perpendicular to the straightening means for removing the ovalness of the pipe caused by being coiled.

In one of its method aspects there is provided a method for removing coil set and ovalness from coiled pipe with a portable device, comprising unwinding the pipe from the reel, straightening the pipe to remove substantially all of the permanent curvature in the pipe caused by being coiled, and rerounding the pipe to remove the ovalness of the pipe caused by being coiled.

DESCRIPTION OF THE PREFERRED EMBODIMENTS

Figure 1:
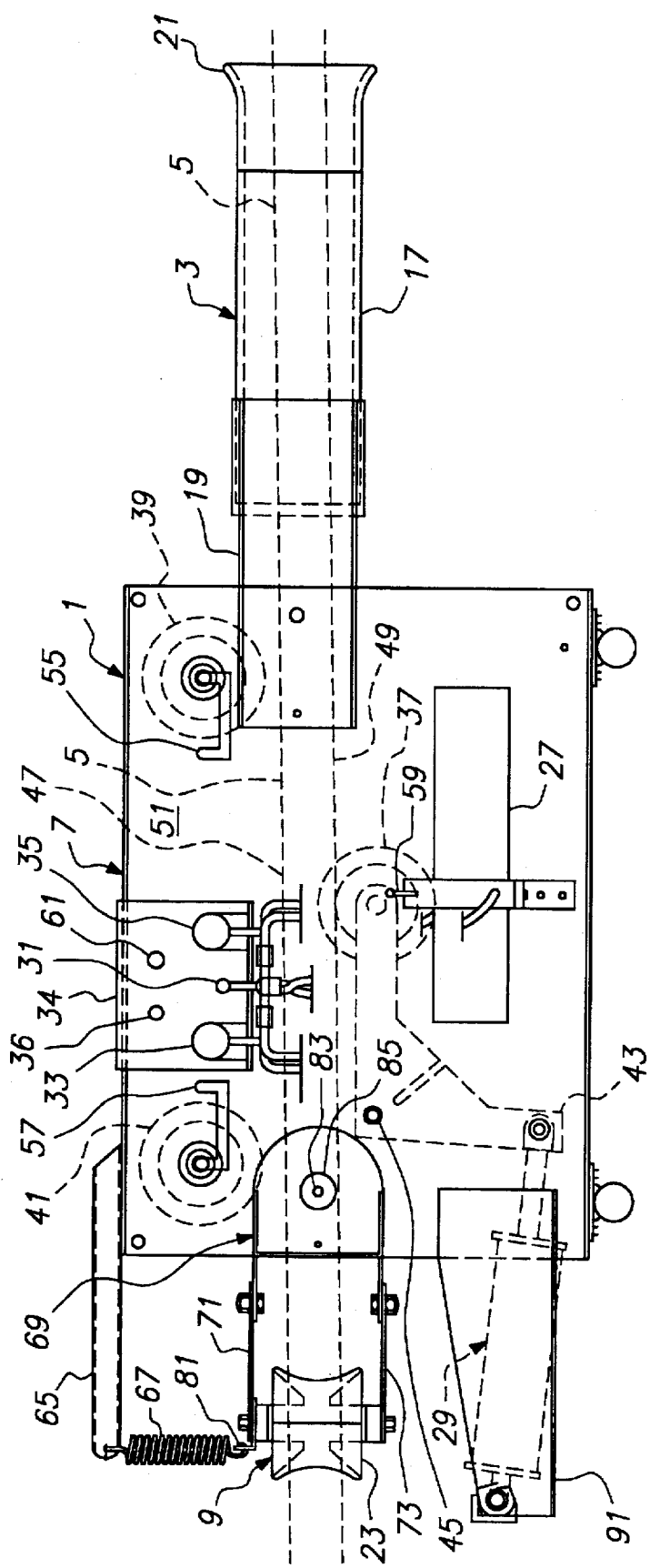
FIG. 1 is a left side view of a portable straightening and rerounding device in accordance with one embodiment of the present invention before the plastic pipe is being straightened.
Figure 1A:
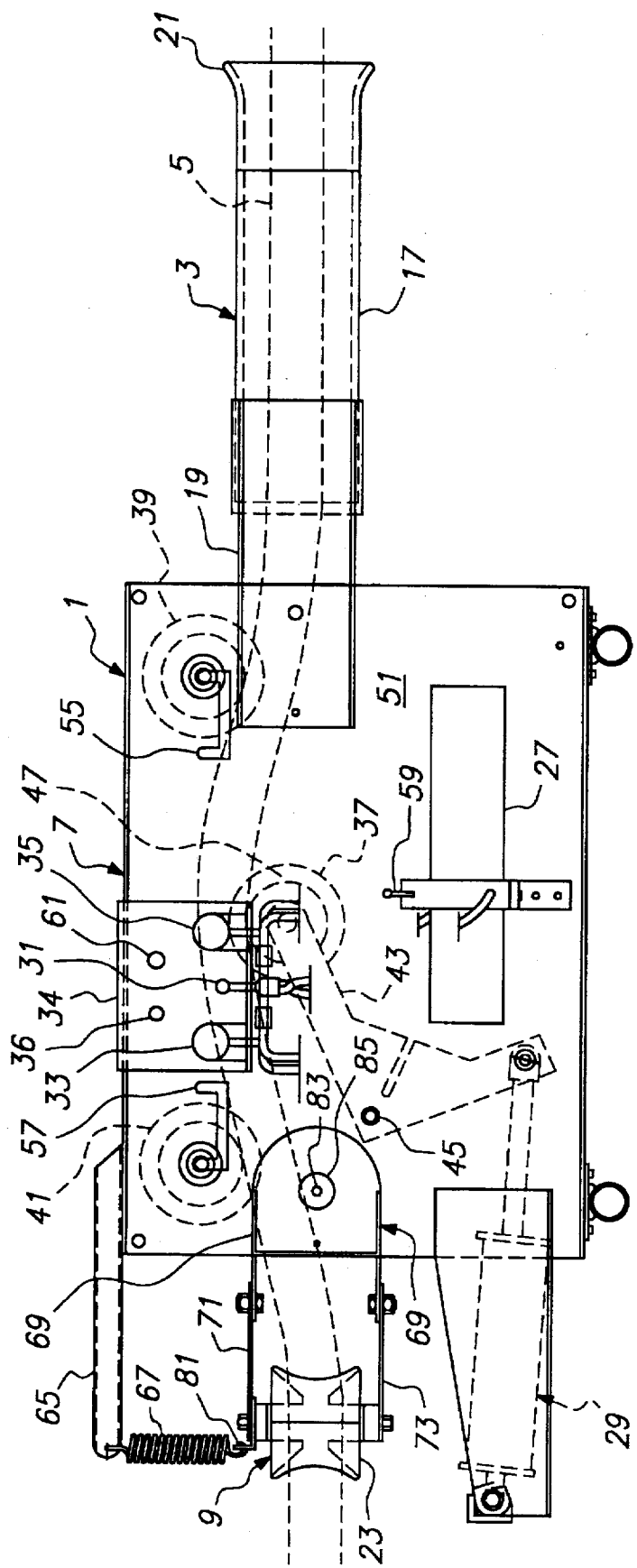
FIG. 1A is a left side view of the portable straightening and rerounding device of FIG. 1 showing the plastic pipe being straightened.
Figure 3:
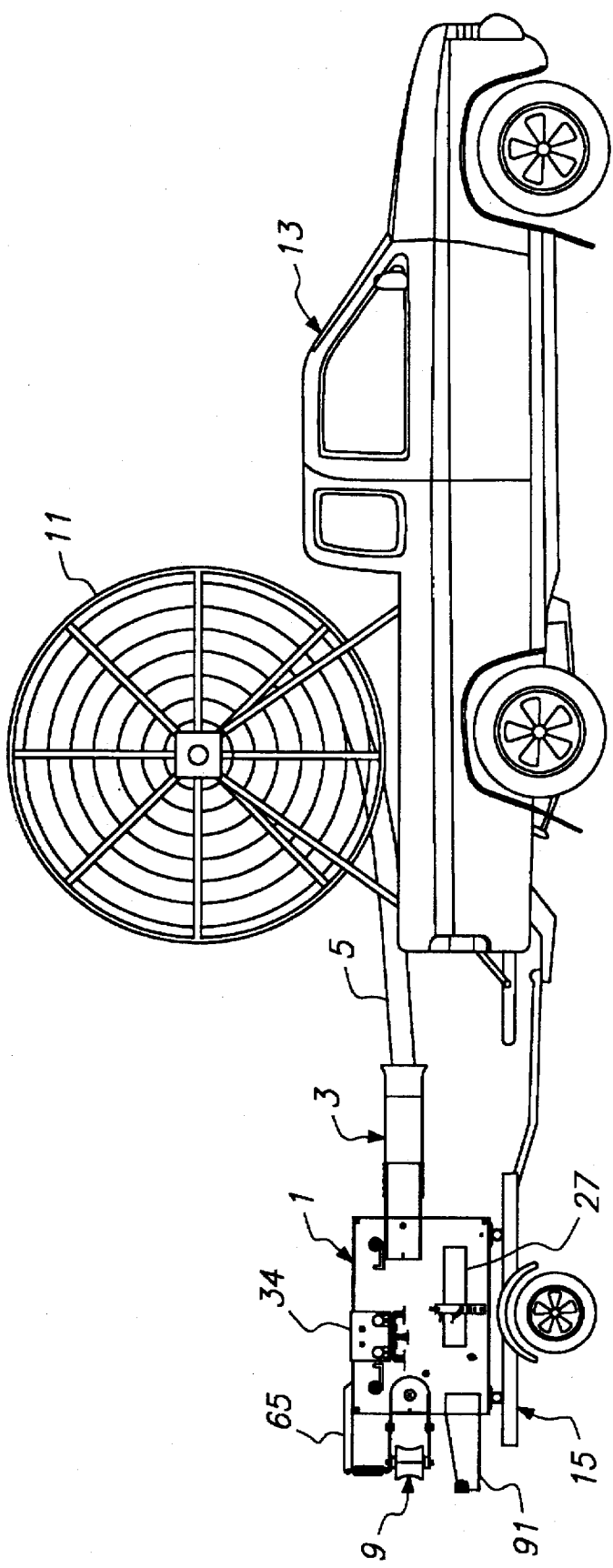
FIG. 3 is a left side view of the portable straightening and rerounding device in accordance with one embodiment of the present invention being towed behind a truck having a reel of coiled plastic pipe therein.

With continued reference to the drawing, FIGS. 1 and 1A are a portable pipe straightening and rerounding device 1, in accordance with one embodiment of the present invention, suitable for mounting on a trailer 15 (FIG. 3) or other movable device such as a sled, track, etc. As can be seen in FIG. 3, the plastic pipe 5 is typically coiled onto a large reel 11 shortly after the manufacture of pipe. The pipe 5 can also be wound into a cage (not shown). In both cases, the pipe is coiled. The reel 11 with the pipe 5 coiled thereon is typically stored for long periods of time before use. When the pipe is used, it is typically loaded onto a track 13, or other mobile device, as shown in FIG. 3 for transportation to the job site. At the job site, the reel 11 can sometimes be placed on a stationary reel stand (not shown). The long storage time and the nature of plastic generally cause the plastic pipe 5 to loose its round cross-sectional shape (i.e., roundness) and take on an oval shape. The ovalness causes great difficulty in joining one end of a section of pipe with another end of a section of pipe or with a terminal location, therefore the present invention can be used to restore the pipe's round cross-sectional shape so that it can be joined more easily with other sections of pipe or with a terminal location. The long storage time and nature of plastic also cause the plastic pipe 5 to take on a coiled shape such that the pipe will not lay flat in a trench or on the ground for example, therefore the present invention can be used to straighten the pipe 5 so that it will lay flat in a trench without the danger of it recoiling and damaging equipment or injuring workers at the job site.

For plastic pipe, it is desired to first straighten the pipe then remove the ovalness. If the ovalness is removed first, the pipe will regain its ovalness as it is subsequently straightened. Therefore, a straightening (i.e., bending) unit 7 is located forward of the rerounding unit 9. In addition, the rerounding unit 9 is oriented 90° to the straightening unit 7. In other words, an imaginary plane which is perpendicular to the axes of the rollers of the rerounding unit is parallel to the axes of the rollers of the straightening unit. Located at the forward end of the device 1 is a pipe guide 3 for directing the plastic pipe 5 into the device 1 and orienting the pipe 5 properly. The pipe guide 3 in one embodiment is comprised of a sleeve 17 attached to a flange 19 extending from each side of the device 1. In another embodiment, the pipe guide 3 is comprised of an outer sleeve mounted around an inner sleeve. In this way, the outer sleeve can be slid along the inner sleeve in order to adjust the length of the pipe guide to an optimal length for controlling the coiled pipe as it is fed into the device. The length of the pipe guide is adjusted such that the lateral bend imposed on the pipe as it is unwound from the reel into pipe guide does not result in permanent lateral bending of the pipe (i.e., the elastic limit of the pipe is not exceeded). A flared inlet 21 allows the coiled pipe 5 to pass into the sleeve 17 without being damaged or getting hung up on the edges of the pipe guide as it passes through the pipe guide 3. The flared inlet 21 can be adjusted far enough away with sleeve 17 from the reel 11 to prevent any sharp lateral bends. Preferably, the flared inlet 21 is made of plastic to protect the pipe from damage.

At the job site, typically a pulling head (not shown) is fused or installed onto the free end of the pipe 5. When the pipe 5 is to be pulled through the device 1, it is preferable to use a soft strap or rope to pull the pipe 5 through the device 1 to avoid damaging the straightening unit 7 and the rerounding unit 9. Before engaging the straightening unit 7 or the rerounding unit 9 with the pipe outer surface, the pipe 5 must be all the way through the device 1 as seen in FIG. 1, preferably with at least one foot of pipe extending past the rerounding unit 9.

After the pipe 5 is in the proper starting position, the rollers 21,23 (FIG. 2) of rerounding unit 9 are brought into contact with the side surfaces of the pipe 5 to remove the ovalness of the pipe. Roller 23 is preferably adjustable using the hydraulic unit 25 (not shown in FIGS. 1 and 1A for clarity) toward and away from the pipe 5 in order to compress the pipe 5 between the concave surfaces of the rollers 21 and 23 past its elastic limit to reround the plastic pipe.

Rerounding unit 9 is attached to the device 1 by support arm 65, spring 67 and the vertical pivot plate assemblies 69 (only one shown) such that the rerounding unit is free to travel vertically (i.e., float). Each of the vertical pivot plate assemblies 69 are pivotally attached at their proximal ends to the panels 51 and 53, respectively. An anti-friction disc 85 preferably is located between the assemblies and the panels. Pivotally attached to the distal ends of the pivot plate assemblies 69 are horizontal pivot plates 71 and 73. Roller 23 is mounted vertically between the horizontal pivot plates 71 and 73. Roller 21 is mounted vertically between the horizontal pivot plates 75 and 77. Each of the respective horizontal pivot plates allow the rollers 21 and 23 to be adjusted inward or outward with respect to the pipe to accommodate different diameter pipes.

Lower roller support arm 79 connects the lower portions of the horizontal pivot plates 73 and 77 together. Upper roller support arm 81 connects the upper portions of the horizontal pivot plates 71 and 75. Lower roller support arm 79 and upper roller support arm 81 have a slot (not shown) extending laterally across their width to allow the hydraulic unit 25 to move roller 23 toward or away from roller 21 in order to apply the desired pressure for rerounding the pipe. Upper roller support arm 81 is suspended from spring 67, in this way the rerounding unit 9 is free to move vertically about the pivot points 83 for each vertical pivot plate assembly as the pipe 5 moves through the rerounding unit.

Figure 2:
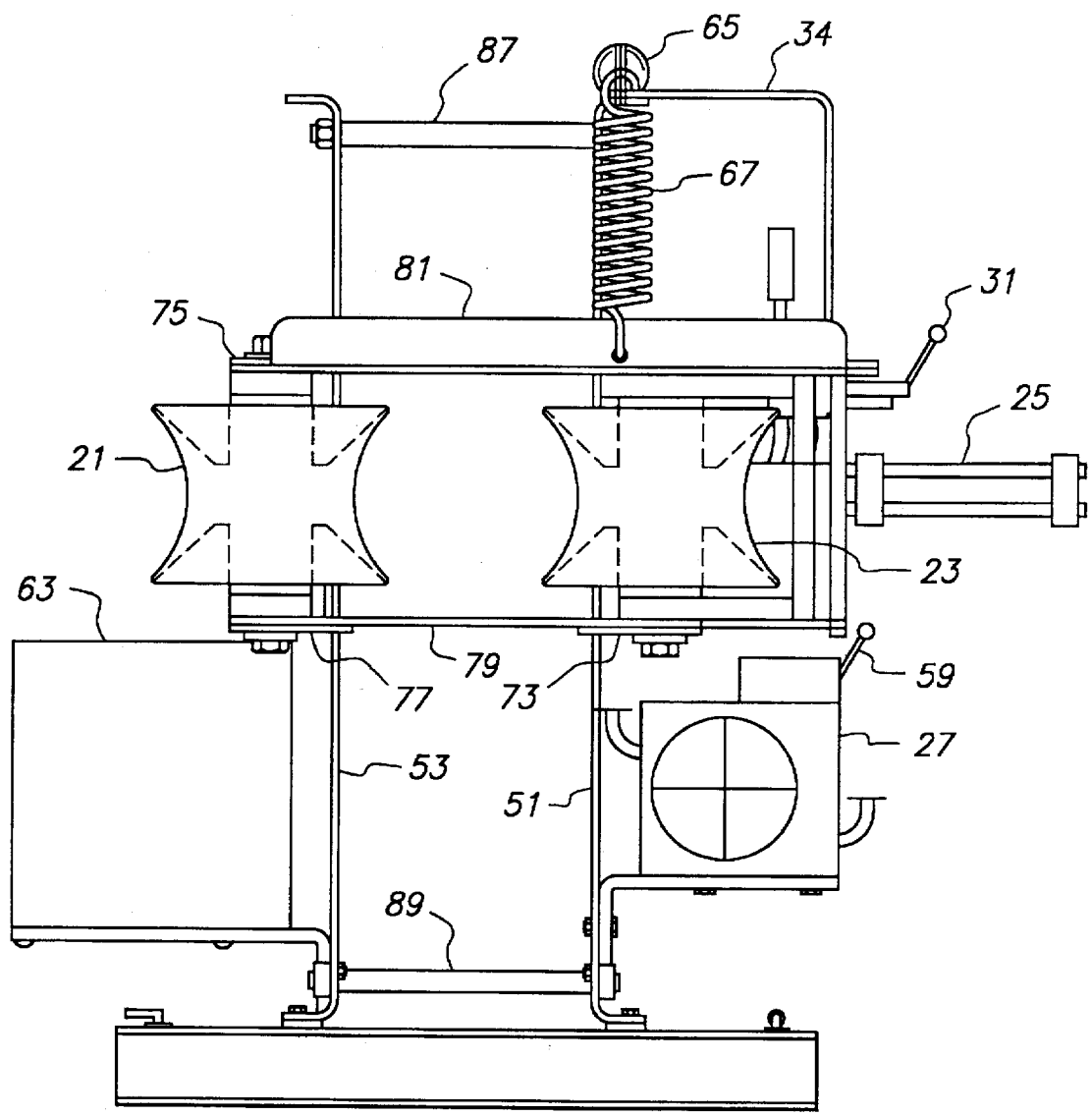
FIG. 2 is a rear view of a portable straightening and rerounding device in accordance with one embodiment of the present invention.

Hydraulic unit 27 is located along the side of device 1 for controlling both the rerounding hydraulic unit 25 and the straightening hydraulic unit 29 (not shown in FIG. 2 for clarity). An optional tool box 63 can be located on the other side of the device 1. Control handle 59 can be provided for engaging the hydraulic unit 27. Control light 61 indicates when the hydraulic unit 27 is engaged.

Function selector valve 31 is first moved into position for setting the hydraulic pressure for the rerounding rollers 21,23 using rerounder pressure gauge 33 located in housing 34. A battery (not shown) connected to battery power light 36 can be located on the trailer 15 or in housing 34 for powering the hydraulic control unit 27. Alternatively, another power source such as a portable generator can be provided for powering the hydraulic units. The proper rerounding hydraulic pressure depends on the pipe size, pipe type, speed at which the pipe is pulled through the device, amount of curvature of the pipe, and ambient operating temperature. The following Table I is illustrative of proper rerounding hydraulic pressures for high and medium density polyethylene pipe. These pressures can be adjusted during operation to compensate for the particular curvature of the pipe and other conditions.

TABLE I

| | Rerounder Gauge Pressure (psi) | | | |
| --- | --- | --- | --- | --- |
| | Ambient Temperature (°F.) | | | |
| | PE3408 | | PE2406 | |
| Pipe Size | 32°–70° | 71°–110° | 32°–70° | 71°–110° |
| 3" | 300 | 250 | 250 | 200 |
| 4" | 600 | 500 | 500 | 450 |
| 5" | 900 | 850 | 850 | 800 |
| 6" | 1250 | 1200 | 1200 | 1150 |

After the rerounder hydraulic pressure is set correctly for the conditions, the pipe 5 is slowly pulled through the device 1. A pulling speed of 50 to 100 feet per minute is preferable. The pipe 5 can be pulled into a trench with a plowing vehicle or can be pulled into the ground by a directional boring machine. Likewise, the pipe 5 can be pulled through the device 1 by towing the device behind the truck 13 and stringing the pipe on the ground for direct burial or relining of a worn or damaged pipe as the truck and trailer pull forward.

Iust after the pipe 5 has begun to be pulled through the device 1, the function control lever 31 is switched to the proper position for setting the straightening hydraulic pressure with the straightening pressure gauge 35. When the pipe 5 is initially loaded in the device 1, adjustable roller 37 contacts the bottom surface of the pipe 5 and rollers 39,41 are not in contact with the top surface of the pipe 5. Rollers 39,41 are rotatably supported between side panels 51,53 of device 1. Connecting members 87 and 89 support the side panels 51,53 at the desired distance apart. The pipe 5 initially has a concave edge along its top surface 47 and a convex edge along its bottom surface 49 because of the coil set in the pipe created by being wound on the reel 11.

As the straightening hydraulic pressure is set, roller 37 mounted between angled members 43 (only one shown) pushes the pipe 5 up into contact with the rollers 39,41. Angled members 43 are pivoted about mounting point 45 by the hydraulic unit 29 attached to the angled members 43 on the end opposite of the roller 37 about the mounting point 45. Hydraulic unit 29 is attached at its opposite end to tinge 91 extending from each of the side panels 51 and 53. The straightening hydraulic pressure is set such that the pipe 5 is pressed past a horizontal position to an arched position between the rollers 39 and 41. In this way, the pipe is reverse bent past its elastic limit to straighten the pipe before it reaches the rerounding unit 9. The reverse bending in the substantially vertical plane removes any permanent curvature or deformation in the pipe 5 caused by being wound on the reel 11. The amount of reverse bending is determined by the width between the rollers 39 and 41, and by the vertical position of the adjustable roller 37 which is adjusted by the hydraulic unit 29 or other suitable system such as a threaded crank assembly (not shown).

The proper straightening hydraulic pressure depends on the pipe size, pipe type, speed at which the pipe is pulled through the device, amount of curvature of the pipe, and ambient operating temperature. During any stop of pulling, the straightening unit 7 should be disengaged from the pipe 5 until pulling is continued. For any stop of pulling longer than about ten minutes, the rerounding unit 9 should be disengaged from the pipe. The following Table II is illustrative of proper straightening hydraulic pressures for high and medium density polyethylene pipe. These pressures can be adjusted during operation to compensate for the particular curvature of the pipe and other conditions.

TABLE II

| | Straightener Gauge Pressure (psi) | | | |
|---|---|---|---|---|
| | Ambient Temperature (°F.) | | | |
| | PE3408 | | PE2406 | |
| Pipe Size | 32°–70° | 71°–110° | 32°–70° | 71°–110° |
| 3" | 250 | 250 | 250 | 200 |
| 4" | 500 | 450 | 450 | 400 |
| 5" | 700 | 700 | 700 | 650 |
| 6" | 1550 | 1500 | 1500 | 1400 |

The straightening unit 7 includes means for varying the radius of curvature to which the pipe 5 is bent in a vertical plane as it travels through the device 1. One part of that means is the hydraulic unit 29 and roller 37 mounted on angled member 43. Another part of that means is the adjustability of roller 39 in U-shaped groove 55 in side panel 51. There is a corresponding groove (not shown) in side panel 53. Likewise, roller 41 is adjustable within U-shaped groove 57 in side panel 51 and there is a corresponding groove (not shown) in side panel 53. Typically, the wide roller setting shown in FIGS. 1 and 1A for rollers 39 and 41 is used for pipe having an outer diameter between 4 to 6 inches. The narrow roller setting is used for pipe having an outer diameter of 3 inches.

All of the straightening rollers 37,39,41 and rerounding rollers 21,23 have concave surfaces for engaging the pipe. The rerounder rollers for pipe diameters of 3 to 4 inches have typically shallow concave surfaces. For example, a roller with an overall width of 4.867 inches would have a concave surface having a radius of 5.187 inches which is a roller having an outside diameter of 6.915 inches and a diameter at the bottom of the concave surface of 6.000 inches. The straightening rollers for pipe diameters of 3 to 6 inches and the rerounding rollers for pipe diameters of 5 to 6 inches have typically deep concave surfaces. For example, a roller with an overall width of 6.500 inches would have a concave surface having a radius of 3.975 inches which is a roller having an outside diameter of 8.500 inches and a diameter at the bottom of the concave surface of 6.000 inches.

Modifications and variations of the present invention will be apparent to those having ordinary skill in the art having read the above teachings above, and the present invention is thus limited only by the spirit and scope of the following claims.

What is claimed is:

1. A portable device, comprising:
   a first fixed roller for contacting a first surface of a pipe and having an axis;
   a second fixed roller spaced rearward in the portable device from the first fixed roller for contacting the first surface of the pipe, the second fixed roller having an axis parallel to the axis through the first fixed roller;
   a movable roller located between the first fixed roller and the second fixed roller for contacting a second surface of the pipe opposite of the first surface, the movable roller is adjustable toward and away from a plane through the axis of the first fixed roller and the axis of the second fixed roller to remove substantially all of the permanent curvature in the pipe by applying pressure to the pipe;
   a stationary rerounding roller located aft of the second fixed roller for contacting a third surface between the first surface and the second surface of the pipe and having an axis; and
   an adjustable rerounding roller for contacting a fourth surface of the pipe opposite of both the third surface and the stationary rerounding roller and having an axis parallel to the axis of the stationary roller, the adjustable roller is directly opposed to the stationary roller and adjustable toward the stationary roller to apply pressure to remove ovalness of the pipe.

2. The portable device of claim 1 wherein the axes of the stationary roller and the adjustable roller are oriented 90 degrees from the axes of the first fixed roller, the second fixed roller and the movable roller.

3. The portable device of claim 1 further comprising wheels for supporting and transporting the portable device.

4. The portable device of claim 1 further comprising a hydraulic mechanism attached to the movable roller for adjusting the movable roller toward and away from the plane through the axes of the first fixed roller and the second fixed roller for straightening the pipe.

5. The portable device of claim 1 further comprising a hydraulic mechanism attached to the adjustable roller for applying pressure to the pipe with the adjustable roller.

6. The portable device of claim 1 further comprising a guide assembly to orient the pipe and prevent the pipe from twisting as the pipe enters the device.

7. The portable device of claim 1 wherein the axes of the stationary roller and the adjustable roller are substantially vertical.

8. The portable device of claim 1 wherein the stationary rerounding roller and adjustable rerounding roller are mounted on pivoting assemblies.

9. A portable device, comprising:
   a straightening means for removing substantially all of the permanent curvature in a pipe caused by being coiled; and
   a rerounding means oriented perpendicular to the straightening means for removing ovalness of the pipe caused by being coiled.

10. The portable device of claim 9 wherein the straightening means comprises:
    a first roller for contacting a first surface of the pipe and having an axis;
    a second roller spaced from the first roller for contacting the first surface of the pipe, the second roller having an axis parallel to the axis through the first roller; and
    a movable roller between the first roller and the second roller for contacting a second surface of the pipe opposite of the first surface, the movable roller is adjustable with respect to a plane through the axis of the first roller and the axis of the second roller for applying pressure to straighten the pipe.

11. The portable device of claim 9 wherein the rerounding means comprises:
    a rerounding roller for contacting a third surface between the first surface and the second surface of the pipe and having an axis; and
    an adjustable roller for contacting a fourth surface of the pipe opposite of the third surface and having an axis parallel to the axis of the rerounding roller, the adjustable roller is adjustable toward the rerounding roller for applying pressure to remove the ovalness of the pipe.

12. The portable device of claim 11 wherein the rerounding means is oriented such that the axes of the rerounding roller and the adjustable roller are oriented 90 degrees from the axes of the rollers of the straightening means.

13. The portable device of claim 9 wherein the rerounding means is aft of the straightening means.

14. The portable device of claim 9 further comprising wheels for supporting and transporting the portable device.

15. The portable device of claim 10 further comprising a hydraulic mechanism attached to the movable roller of the straightening means for adjusting the movable roller toward and away from the plane through the axis of the first roller and the axis of the second roller.

16. The portable device of claim 9 further comprising a guide assembly attached to the straightening means.

17. The portable device of claim 9 wherein the rerounding means is attached to the portable device by means for allowing the rerounding means to float.

18. A method for removing coil set and ovalness from coiled pipe with a portable device, comprising:
    unwinding the pipe;
    straightening the pipe to remove substantially all of the permanent curvature in the pipe caused by being coiled; and
    rerounding the pipe to remove the ovalness of the pipe caused by being coiled by contacting directly opposed sides of the pipe with rerounding means.

19. The method of claim 18 wherein the straightening step comprises:
    contacting a first surface of the pipe with a first roller having an axis;
    contacting the first surface of the pipe with a second roller spaced from the first roller and having an axis parallel to the axis through the first roller; and
    contacting a second surface of the pipe opposite of the first surface with a third roller positioned between the first roller and the second roller for contacting a second surface of the pipe opposite of the first surface.

20. The method of claim 19, wherein contacting the second surface of the pipe comprises:
    adjusting the third roller with respect to a plane through the axis of the first roller and the axis of the second roller for applying pressure to straighten the pipe.

21. The method of claim 18 wherein the rerounding step using said rerounding means comprises:
    contacting a third surface between the first surface and the second surface of the pipe with a first rerounding roller having an axis; and
    contacting a fourth surface of the pipe opposite of the third surface with a second rerounding roller having an axis parallel to the axis of the first rerounding roller.

22. The method of claim 21 wherein contacting the fourth surface comprises adjusting the second rerounding roller toward the first rerounding roller for applying pressure to remove the ovalness of the pipe.

23. The method of claim 18 wherein the rerounding is accomplished after the straightening.

* * * * *